US007097680B2

(12) United States Patent
Oh

(10) Patent No.: US 7,097,680 B2

(45) Date of Patent: Aug. 29, 2006

(54) CYCLONE SEPARATING APPARATUS AND VACUUM CLEANER EQUIPPED WITH THE SAME

(75) Inventor: Jang-keun Oh, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 49 days.

(21) Appl. No.: 10/840,229

(22) Filed: May 7, 2004

(65) Prior Publication Data

US 2005/0050863 A1 Mar. 10, 2005

(30) Foreign Application Priority Data

Sep. 9, 2003 (KR) ...................... 10-2003-0063213

(51) Int. Cl.
*B01D 45/12* (2006.01)

(52) U.S. Cl. ............................ 55/343; 55/349; 55/429; 55/459.1; 55/DIG. 3; 96/415; 96/416; 15/350; 15/353

(58) Field of Classification Search .................. 55/343, 55/346, 348, 349, 426, 429, 459.1, DIG. 3; 96/415, 416; 15/350, 353
See application file for complete search history.

(56) References Cited

U.S. PATENT DOCUMENTS

| | | | | |
|---|---|---|---|---|
| 1,416,995 | A | 5/1922 | Stroud | |
| 2,553,175 | A * | 5/1951 | Davenport et al. | 55/343 |
| 3,425,192 | A | 2/1969 | Davis | |
| 4,373,228 | A | 2/1983 | Dyson | |
| 6,238,451 | B1 | 5/2001 | Conrad et al. | |
| 6,334,234 | B1 * | 1/2002 | Conrad et al. | 15/347 |
| 6,428,589 | B1 * | 8/2002 | Bair et al. | 55/318 |
| 6,582,489 | B1 | 6/2003 | Conrad | |
| 6,607,572 | B1 | 8/2003 | Gammack et al. | |

FOREIGN PATENT DOCUMENTS

| | | |
|---|---|---|
| GB | 2360719 | 10/2001 |
| GB | 2 374 305 | 10/2002 |
| GB | 2381484 | 5/2003 |
| GB | 2406065 | 3/2005 |
| JP | S52-14775 | 2/1977 |
| JP | 2003-024826 | 1/2003 |
| WO | WO 02/067756 | 9/2002 |
| WO | WO 02/087750 | 9/2002 |

OTHER PUBLICATIONS

Russian Patent Office, Office Action issued in connection with corresponding application No. 2004118404.

* cited by examiner

*Primary Examiner*—Robert A. Hopkins
(74) *Attorney, Agent, or Firm*—Blank Rome LLP

(57) ABSTRACT

Disclosed is a cyclone separating apparatus, and a vacuum cleaner having the same. The cyclone separating apparatus includes a first cyclone separating dust from dust-ladened air. A plurality of second cyclones centrifugally separate fine dust particles from air which is first separated at the first cyclone. A dust collecting unit detachably connects to the first and the second cyclones. The dust collecting unit separately collects large dust particles separated at the first cyclone, and fine dust particles separated at the second cyclone. Accordingly, a more compact cyclone separating apparatus can be realized with improved suction efficiency and dust collecting efficiency.

13 Claims, 4 Drawing Sheets

CYCLONE SEPARATING APPARATUS AND VACUUM CLEANER EQUIPPED WITH THE SAME

REFERENCE TO RELATED APPLICATION

This application claims priority to copending Korean Application No. 2003-63213, filed Sep. 9, 2003, in the Korean Intellectual Property Office, the disclosure of which is incorporated herein by reference.

CROSS-REFERENCE TO RELATED APPLICATIONS

This application is related to copending applications entitled "Cyclone Separating Apparatus and Vacuum Cleaner having the same" (Korean Application Nos. 2003-63211, filed Sep. 9, 2003), "Cyclone Dust Separating Apparatus and Vacuum Cleaner having the same" (Korean Application No. 2003-63212 filed Sep. 9, 2003), and "Cyclone Separating Apparatus and Vacuum Cleaner having the same" (Korean Application No. 2003-62520, filed Sep. 8, 2003), whose disclosures are commonly owned by the same assignee as the present application and are entirely incorporated herein by reference.

FIELD OF THE INVENTION

The present invention relates to a cyclone separating apparatus and a vacuum cleaner equipped with the same, and more particularly, to a cyclone separating apparatus which includes a first cyclone, a plurality of second cyclones, and a dust collecting unit removably connected to the first and the second cyclones to separately collect large dust particles separated at the first cyclone, and fine dust particles separated at the second cyclone, and a vacuum cleaner having the same.

BACKGROUND OF THE INVENTION

In general, a cyclone separating apparatus generates a vortex in a cyclone chamber to centrifugally separate dust and dirt. Embodiments of such a cyclone separating apparatus applied to a vacuum cleaner are disclosed in U.S. Pat. Nos. 3,425,192 and 4,373,228.

In the above cited patents, a conventional cyclone dust collecting apparatus is disclosed which separates dust from dust-ladened air using a plurality of cyclones. In the above structure, large dust particles or dirt are separated at a first cyclone, and the dust-separated air flows into a second cyclone or an auxiliary cyclone to separate fine dust particles or dirt discharging cleaned air. In U.S. Pat. No. 3,425,192, the auxiliary cyclone is disposed above the first cyclone. The first cyclone separates large dust particles or dirt, and partially cleaned air from the first cyclone flows into the auxiliary cyclone wherein fine dust particles or dirt are separated. U.S. Pat. No. 4,373,228, discloses a plurality of cyclone units, wherein the auxiliary cyclone is disposed in the first cyclone. However, the conventional cyclone separating apparatus has numerous problems.

First, connection of the first cyclone to the auxiliary cyclone is so complex that a suction force generated at a cleaner body is not transmitted well, thus causing a poor cleaning efficiency. In addition, the first and the auxiliary cyclones are not disposed in a compact arrangement. Accordingly, the cyclone separating apparatus and the vacuum cleaner are bulky. This causes inconvenience of keeping the vacuum cleaner when it is not in use, and handling the same during a cleaning work. Further, since a connection path between the first and the auxiliary cyclones is complex, a manufacturing process becomes complicated, and accordingly, required parts increase. Therefore, manufacturing costs also increase.

Thus, a heretofore unaddressed need exists in the industry to address the aforementioned deficiencies and inadequacies.

SUMMARY OF THE INVENTION

The present invention was made to overcome the above-mentioned problems of the related art. Accordingly, it is an object of the present invention to provide a compactly structured cyclone separating apparatus capable of improving suction efficiency using a plurality of conventional cyclone dust collecting apparatus, and preventing deterioration of a suction force, and, a vacuum cleaner equipped with the same.

In order to achieve the above-described objects of the present invention, a cyclone separating apparatus is provided for a vacuum cleaner, comprising a first cyclone separating dust from dust-ladened air, a plurality of second cyclones centrifugally separating fine dust particles from air which is first separated at the first cyclone and a dust collecting unit detachably connected to the first and the second cyclones. The cyclone separating apparatus separately collects large dust particles separated at the first cyclone, and fine dust separated at the second cyclone. The dust collecting unit includes a first dust receptacle for collecting dust separated by the first cyclone, and a second dust receptacle for collecting dust separated by the second cyclone. The first and the second dust receptacles have a cylindrical shape, and the first dust receptacle is disposed inside the second dust receptacle, and integrally formed therewith. Moreover, the first dust receptacle includes a first sealing member at an upper part which is hermetically connected to the first cyclone. The second dust receptacle includes a second sealing member at an upper part which is hermetically connected to the second cyclone.

The first and the second dust receptacles respectively include at least one transparent or translucent part on sidewalls thereof. The second dust receptacle has a handle on the sidewall. The first cyclone includes a first chamber centrifugally separating dust-ladened air, a first inlet formed at the first chamber to draw-in the dust-laden air, and a first outlet formed at the first chamber to discharge air. The respective second cyclones include a second chamber centrifugally separating air which is first separated at the first cyclone, a second inlet formed at the second chamber to draw-in air which is discharged from the first cyclone, and a second outlet formed at the second chamber to discharge dust-separated air.

The first chamber is cylindrically shaped, and the second chamber includes a predetermined part of one end of a truncated conical shape. The cyclone separating apparatus further includes an inflow and outflow cover formed at a top of the first and the second cyclones which fluidly-connects the first and the second cyclones, and, a cyclone cover formed over the inflow and outflow cover. The cyclone cover has a cone shape which is open upward and downward, and the second cyclone is disposed around an outer circumference of the first cyclone to enclose the first cyclone. The first cyclone is integrally formed with the second cyclone. Cyclone partitions are formed between the respective second cyclones.

To achieve the object of the present invention, a vacuum cleaner is provided comprising a cleaner body drawing-in dust-ladened air, and generating a suction force. A suction brush is fluidly connected to the cleaner body to draw-in dust at a cleaning surface using the suction force. A cyclone separating apparatus is formed in the cleaner body. The cyclone separating apparatus includes a first cyclone separating dust from dust-ladened air, a plurality of second cyclones centrifugally separating fine dust particles from air which is first separated at the first cyclone, and a dust collecting unit detachably connected to the first and the second cyclones. The dust collecting unit separately collects large dust particles separated at the first cyclone and fine dust particles separated at the second cyclone. The dust collecting unit includes a first dust receptacle for collecting dust separated at the first cyclone, and a second dust receptacle for collecting dust separated at the second cyclone.

Other systems, methods, features, and advantages of the present invention will be or become apparent one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

These and other features, aspects, and advantages of the present invention will become better understood with regard to the following description, appended claims, and accompanying drawings. The components in the drawings are not necessarily to scale, emphasis instead being placed upon clearly illustrating the principles of the present invention. Moreover, in the drawings, like referenced numerals designate corresponding parts througout the several views.

DETAILED DESCRIPTION OF THE PREFERRED EMBODIMENTS

Hereinafter, embodiments of the present invention will be described in detail with reference to the accompanying drawings.

Figure 1:
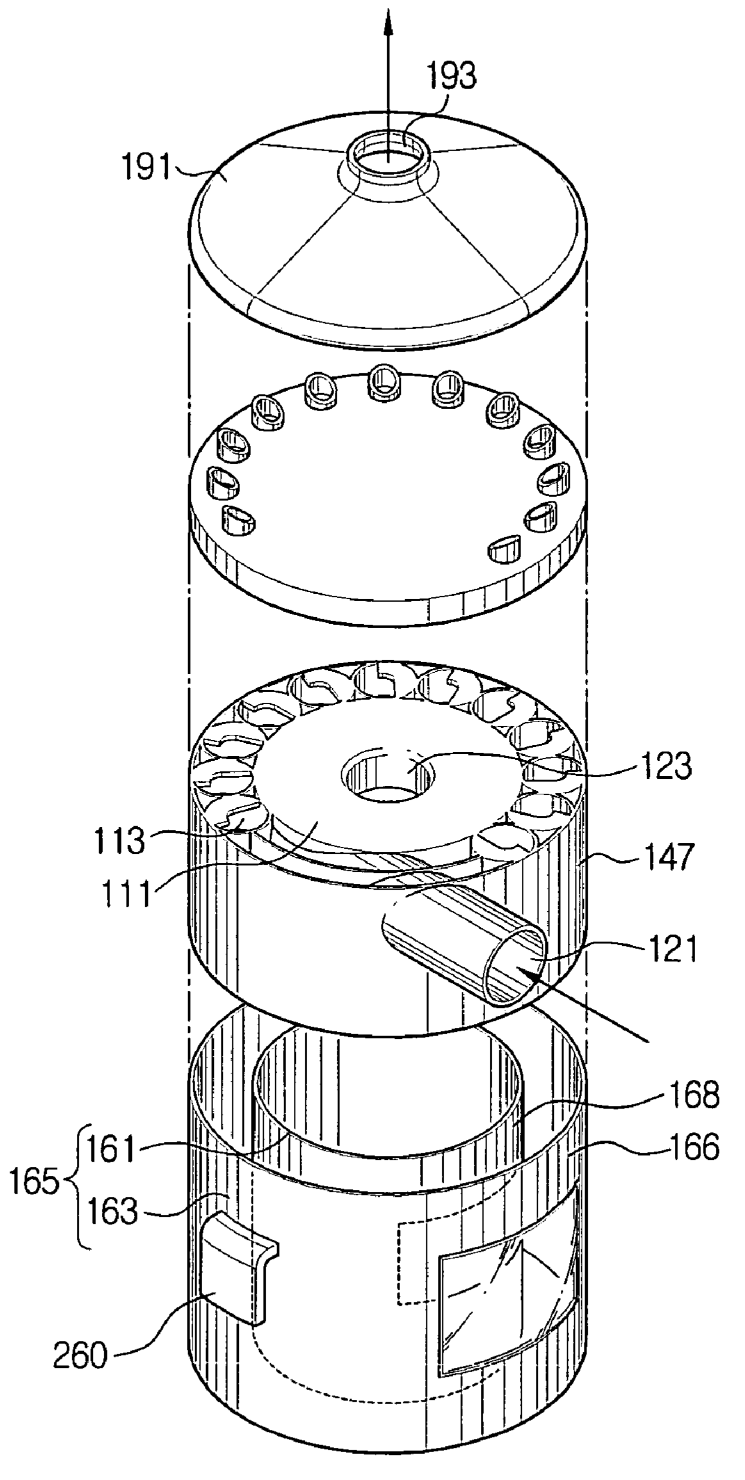
FIG. 1 is a drawing of an exploded perspective view showing main parts of a cyclone separating apparatus according to an embodiment of the invention.
Figure 2:
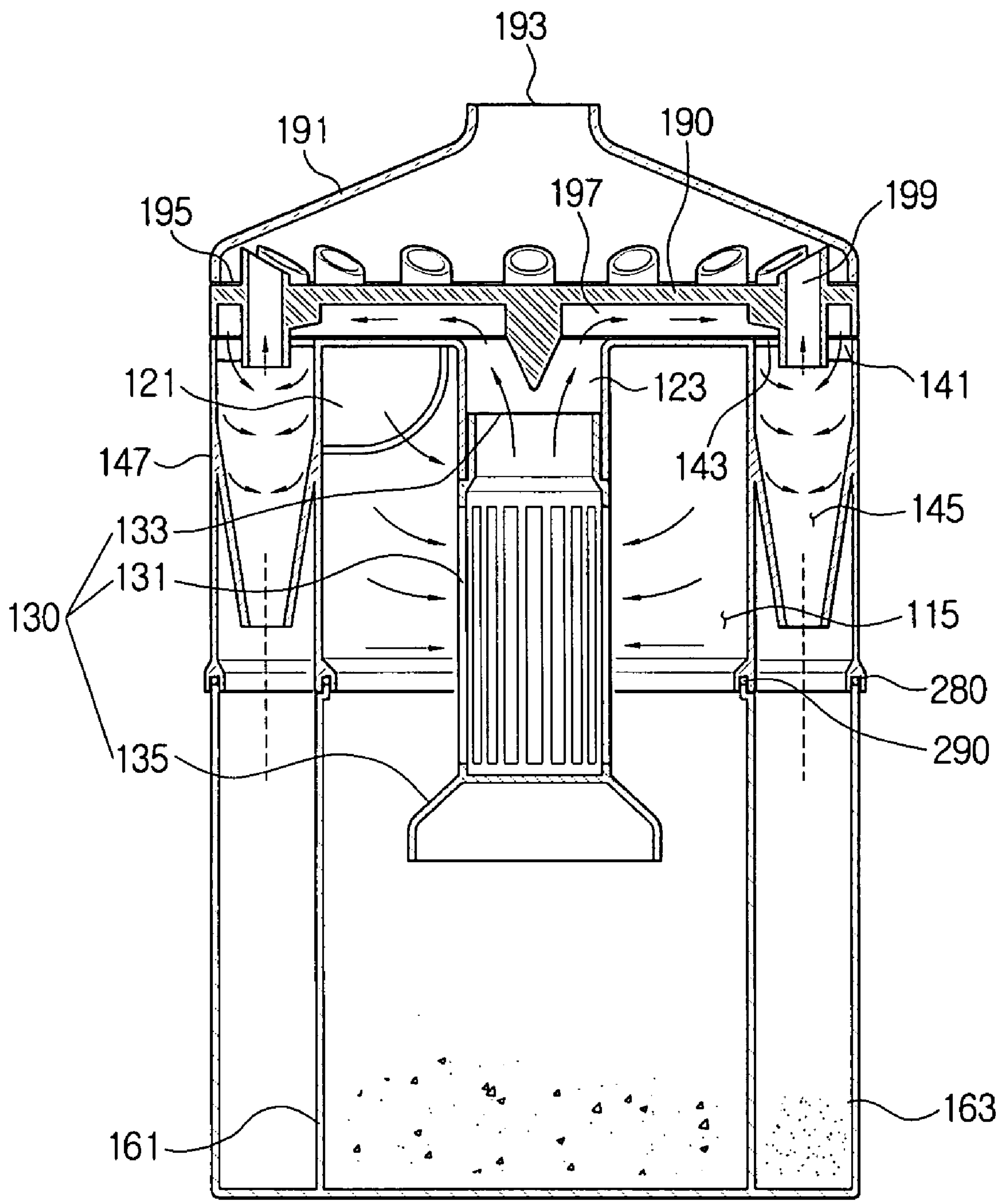
FIG. 2 is a drawing of a sectional view of the cyclone separating apparatus according to an embodiment of the invention.
Figure 3:
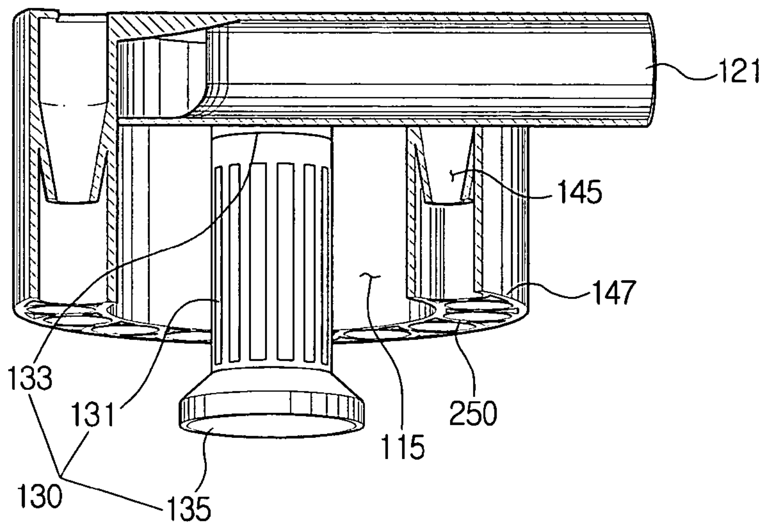
FIG. 3 is a drawing of a partially sectioned perspective view of the cyclone separating apparatus according to an embodiment of the invention.
Figure 4:
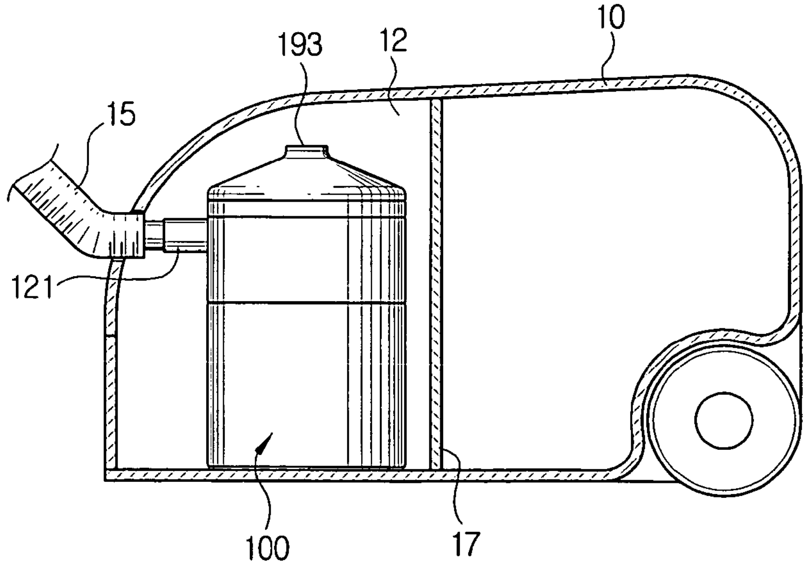
FIG. 4 is a schematic drawing of a sectional view of a canister-type vacuum cleaner employing the cyclone separating apparatus according to an embodiment of the invention.

Referring to FIGS. 1–3, the cyclone separating apparatus according to the present invention includes a first cyclone 111, a plurality of second cyclones 113, an inflow and outflow cover 190 disposed above the first cyclone 111 and the second cyclones 113, a cyclone cover 191, and a dust collecting unit 165. The plurality of second cyclones 113 are formed on an outer circumference of the first cyclone 111, enclosing the first cyclone 111. The first cyclone 111 and the respective second cyclones 113 are integrally formed, and cyclone partitions 250 are disposed between the second cyclones 113, as shown in FIG. 3. The cyclone partitions 250 divide spaces between the respective second cyclones 113, and therefore strongly support the cyclone separating apparatus 100 (FIG. 4). A cylindrical chamber wall 147 is disposed around the second cyclones 113, and is not limited to a cylindrical shape. According to the shape of a receiving portion of a cleaner body 10 (FIGS. 5 and 6), the shape of the chamber wall 147 can be of numerous designs.

The first cyclone 111 includes a first chamber 115, a first inlet 121, a first outlet 123, and a grill member 130. The first chamber 115 is cylindrically shaped and centrifugally separates dust-ladened air via a vortex. The grill member 130 is formed at an upstream side of the first outlet 123. Hence, dust or dirt separated from drawn-in air does not flow back to the first outlet 123. The grill member 130 includes a grill body 131 with plural paths, a grill opening 133, and a screen member 135. The grill opening 133 is formed at one side of the grill body 131 in fluid-communication with the first outlet 123, and discharges dust-separated air. The screen member 135 is formed at the other side of the grill body 131 to prevent separated dust or dirt from flowing back.

The second cyclone 113 includes a second chamber 145, a second inlet 141, and a second outlet 143. The second chamber 145 centrifugally separates dust-ladened air with a predetermined part of one end formed in a truncated conical shape. Air discharged from the first cyclone 111 flows into the second inlet 141, and air centrifugally separated at the second chamber 145 is discharged through the second outlet 143.

The inflow and outflow cover 190 is formed above the first and the second cyclones 111, 113 respectively, and includes an air path 197 fluidly-connecting the first outlet 123 of the first cyclone 111, the second inlet 141 of the second cyclone 113, and a discharging path 199. The discharging path 199 fluidly-communicates with the second outlet 143 of the second cyclone 113, and is inserted into the second outlet 143 of the inflow and outflow cover 190. When the inflow and outflow cover 190 is connected to the second cyclone 113, a predetermined part of the discharging path 199 is inserted into the second outlet 143 to discharge cleaned air therethrough. One end of the discharging path 199 is connected to the second outlet 143 of the second cyclone 113, and the other end is open to a top of the inflow and outflow cover 190.

The cyclone cover 191 includes a conical shape which is open upward and downward, and detachably disposed over the inflow and outflow cover 190. When air discharged from the second outlet 143 of the second cyclone 113 is collected, the collected air is discharged to the outside of the cyclone separating apparatus 100 through a top opening 193 formed at a top of the cyclone cover 191.

The dust collecting unit 165 includes a first dust receptacle 161 and a second dust receptacle 163 and are integrally formed. The dust collecting unit 165 is detachably connected to the first and the second cyclones 111, 113, and separately collects large dust particles separated from the first cyclone 111, and fine dust particles separated from the second cyclone 113. Accordingly, dust collecting efficiency is improved.

The first dust receptacle 161 collects dust separated at the first cyclone 111, and the second dust receptacle 163 collects dust separated at the second cyclone 113. The first and the second dust receptacles 161, 163 respectively, are cylindrically shaped. The first and the second dust receptacles 161, 163 respectively, are detachably connected to the first and the second cyclones 111, 113 respectively. As long as the dust receptacles are capable of collecting dust discharged from the cyclones 111 and 113, the shape thereof is not limited. The first dust receptacle 161 is disposed in the second dust receptacle 163, and is integrally formed with the second dust receptacle 163.

At an upper part of the first dust receptacle 161, a first sealing member 290 is formed to hermetically connect to the first cyclone 111. At an upper part of the second dust receptacle 163, a second sealing member 280 is formed to hermetically connect to the second cyclone 113. Therefore, the first and the second dust receptacles 161, 163 are connected to the first and the second cyclones 111, 113 respectively, in an airtight way.

At least a part of sidewalls 166 and 168 of the first and the second dust receptacles 161 and 163 are made using a transparent or translucent material to see through. The second dust receptacle 163 includes a handle 260 on the sidewall 166. A user can check the inside of the first and the second dust receptacles 161 and 163 at any time. When the dust receptacles 161 and 163 are filled with dust, the user can separate the dust collecting unit 165 from the first and the second cyclones 111 and 113 using the handle 260 in order to empty and remount the first and the second dust receptacles 161 and 163.

As shown in FIG. 4, at one side in the cleaner body 10, a dust collecting chamber 12 is sectioned by a partition 17, and, in the dust collecting chamber 12 the cyclone separating apparatus 100 is disposed. On a circumferential surface of the cyclone separating apparatus 100, a first inlet 121 is formed at one side, for drawing-in air and dust into the cyclone separating apparatus 100 via a flexible hose 15 of the vacuum cleaner while a suction force is generated by a motor (not shown). In the center of a top of the cyclone separating apparatus 100, the top opening 193 is formed for discharging air which is centrifugally separated from dust out of dust-ladened air drawn-into the cyclone separating apparatus 100.

Figure 5:
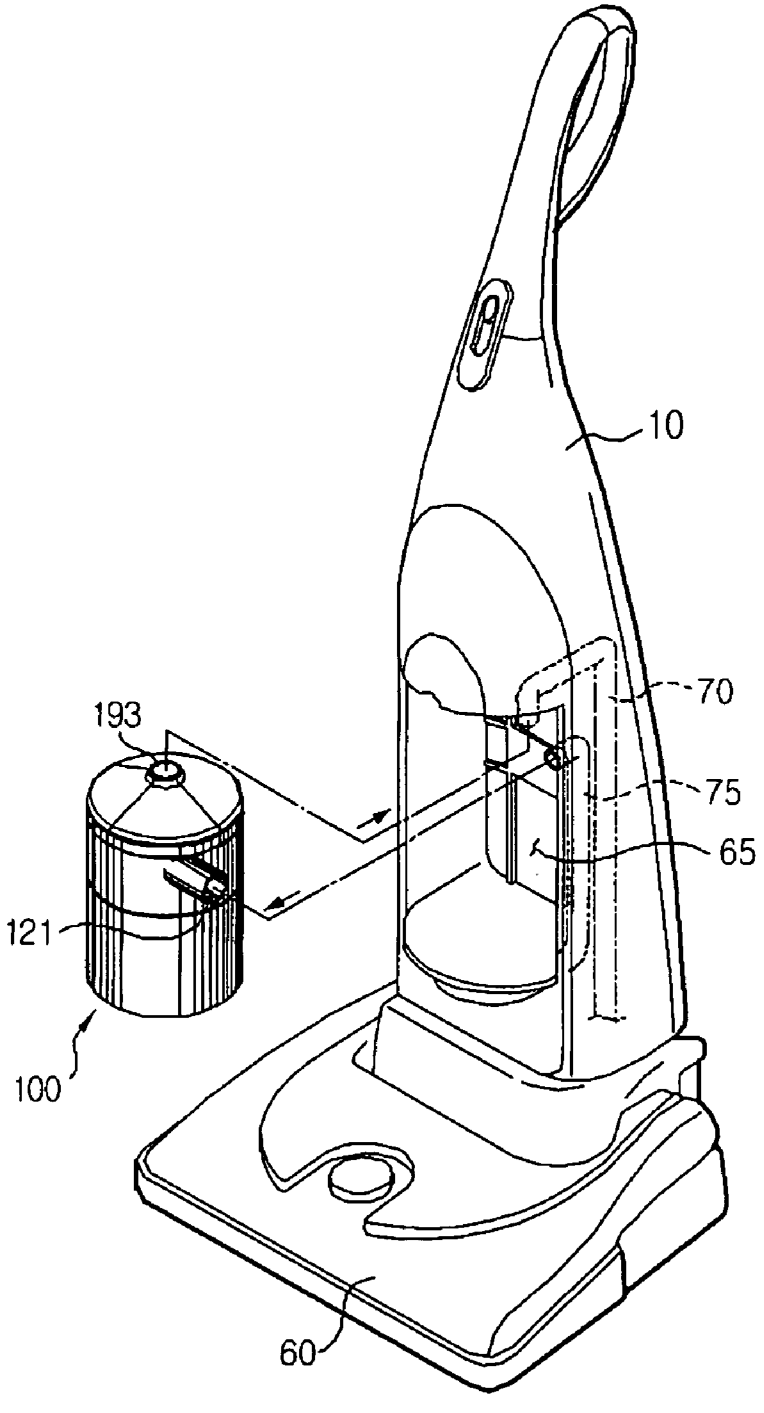
FIG. 5 is a schematic drawing of a perspective view of an upright vacuum cleaner employing the cyclone separating apparatus according to an embodiment of the invention.

The cyclone separating apparatus 100 can be applied to an upright vacuum cleaner as well as a canister-type vacuum cleaner. Referring to FIG. 5, the upright vacuum cleaner equipped with the cyclone separating apparatus 100 will be described.

In the cleaner body 10, a vacuum generator (not shown), that is, a motor driving part, is provided. At a lower part of the cleaner body 10, a suction brush 60 is movably connected. There is a cyclone mounting part 65 on a front in the middle of the cleaner body 10. An air suction path 70 connected to the suction brush 60 is provided in the cyclone mounting part 65, along with an air discharge path 75 connected to the motor driving part.

The first inlet 121 of the cyclone separating apparatus 100 fluidly-communicates with the air suction path 70, and the top opening 193 fluidly-communicates with the air discharge path 75. Dust-ladened air drawn-in through the suction brush 60 passes through the cyclone separating apparatus 100. Thus, dust is separated, and cleaned air passes through the top opening 193 and the air discharge path 75, to be discharged to the outside.

The suction force is generated at the cleaner body 10. The suction brush 60 fluidly-communicates with the cleaner body 10 and draws-in dust-ladened air from a cleaning surface, i.e., a floor, by the suction force. The drawn-in air flows into the first chamber 115 through the first inlet 121 of the cyclone separating apparatus 100 in a tangential direction. The drawn-in air is centrifugally separated at the first cyclone 111, and, relatively large dust particles, and dirt, are collected in the first dust receptacle 161. The first cyclone 111 draws-in dust-ladened air using the suction force generated from the cleaner body 10, and separates relatively large dust particles and dirt.

The first chamber 115 of the first cyclone 111 generates a centrifugal force as air flows in through the first inlet 121 in a tangential direction, and rotates along an inner wall of the first chamber 115. Since air, which is relatively light, is less affected by the centrifugal force, air aggregates into the center of the first chamber 115, and generates a whirlpool. Hence, an airflow is formed toward the first outlet 123 to discharge air.

On the other hand, dust, which is heavier than air, is more affected by the centrifugal force. Therefore, dust flows along the inner wall of the first chamber 115, and is finally collected in the first dust receptacle 161. Air from which large dust particles and dirt separates, flows into the second chamber 145 in a tangential direction passing through the first inlet 123 of the first chamber 115, the air path 197, and the second inlet 141 of the second cyclone 113. Since dust-separated air disperses in a radial direction from the center of the air path 197, a large airflow becomes smaller. Therefore, air separation at the second cyclone 113 is easier.

Air, flowing into the second chamber 145, is centrifugally separated again to collect relatively fine dust particles or dirt in the second dust receptacle 163. The fine dust particles separated at the plurality of second cyclones 113 are collected in the second dust receptacle 163. When separated dust falls into the second dust receptacle 163, the cyclone partition 250 formed between the second cyclones 113 prevents the backflow of dust, and facilitates collection of dust.

Secondarily separated air is gathered at the cyclone cover 191 after passing through the second outlet 143 of the second cyclones 113 and the discharging path 199 of the inflow and outflow cover 190, and is discharged through the top opening 193 formed on a top of the cyclone cover 191. (See FIG. 2). If the first and the second dust receptacles 161, 163 respectively, are filled with dust, the user checks an inner state of the dust receptacles 161, and 163 as necessary, and separates the dust collecting unit 165 from the first and the second cyclones 111 and 113 using the handle 260. Thus, the user can empty and remount the dust receptacles 161 and 163.

Accordingly, since large dust particles and fine dust particles are separated at the first and the second cyclones 111, 113, respectively, dust-ladened air is more effectively collected, and, dust collecting efficiency is improved since it is effective to separate large dust particles first and then separate fine dust particles. Through the above process, air is separated by the cyclone separating apparatus 100, and discharged to the outside through the cleaner body 10.

As described above, there is a limit in preventing deterioration of dust collecting efficiency and dust suction efficiency, in the general conventional cyclone separating apparatus. However, according to the present invention, since large dust particles are separated first, and fine dust particles are then separated, dust collecting efficiency is improved, and the suction efficiency is not deteriorated. Additionally, the vacuum cleaner can be structured compactly.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A cyclone separating apparatus comprising:

a first cyclone separating dust from dust-ladened air;

a plurality of second cyclones centrifugally separating fine dust particles from air which is first separated at the first cyclone; and a dust collecting unit detachably connected to the first and the second cyclones, and separately collects large dust particles separated at the first cyclone and fine dust particles separated at the second cyclone, wherein the dust collecting unit comprises:

a first dust receptacle for collecting dust separated at the first cyclone; and a second dust receptacle for collecting dust separated at the second cyclone.

2. The cyclone separating apparatus of claim 1, wherein the first and the second dust receptacles include a cylindrical shape.

3. The cyclone separating apparatus of claim 1, wherein the first dust receptacle is integrally formed with the second dust receptacle.

4. The cyclone separating apparatus of claim 3, wherein the first dust receptacle includes a first sealing member at an upper part, which is hermetically connected to the first cyclone, and the second dust receptacle includes a second sealing member at an upper part, which is hermetically connected to the second cyclone.

5. The cyclone separating apparatus of claim 4, wherein the first and the second dust receptacles, respectively, include at least one transparent or translucent part on sidewalls thereof.

6. The cyclone separating apparatus of claim 5, wherein the second dust receptacle includes a handle on the sidewall.

7. The cyclone separating apparatus of claim 2, wherein the cyclone separating apparatus further comprises:

an inflow and outflow cover formed at a top of the first and the second cyclones, and fluidly-connects the first and the second cyclones; and a cyclone cover formed over the inflow and outflow cover.

8. The cyclone separating apparatus of claim 7, wherein the cyclone cover includes a cone shape which opens upwards and downwards.

9. The cyclone separating apparatus of claim 8, wherein the second cyclones are disposed on an outer circumference of the first cyclone to enclose the first cyclone, and the first cyclone is integrally formed with the second cyclones.

10. The cyclone separating apparatus of claim 9, wherein cyclone partitions are formed between the respective second cyclones.

11. A vacuum cleaner comprising:

a cleaner body drawing-in dust-ladened air, and generating a suction force;

a suction brush fluidly-connected to the cleaner body to draw-in dust from a cleaning surface using the suction force; and a cyclone separating apparatus formed in the cleaner body, wherein the cyclone separating apparatus comprises:

a first cyclone separating dust from dust-ladened air;

a plurality of second cyclones centrifugally separating fine dust particles from air which is first separated at the first cyclone; and a dust collecting unit detachably connected to the first and the second cyclones, and separately collecting large dust particles separated at the first cyclone and fine dust particles separated at the second cyclone, wherein the dust collecting unit comprises:

a first dust receptacle for collecting dust separated at the first cyclone; and a second dust receptacle for collecting dust separated at the second cyclone.

12. The vacuum cleaner of claim 11, wherein the first receptacle is integrally formed with the second receptacle.

13. The cyclone separating apparatus of claim 11, wherein the first and the second dust receptacles each include at least one transparent or translucent part on at least one sidewall thereof.

* * * * *

UNITED STATES PATENT AND TRADEMARK OFFICE

CERTIFICATE OF CORRECTION

PATENT NO. : 7,097,680 B2
APPLICATION NO. : 10/840229
DATED : August 29, 2006
INVENTOR(S) : Jang-keun Oh It is certified that error appears in the above-identified patent and that said Letters Patent is hereby corrected as shown below:

Column 1, Line 11-25 please change paragraph entitled "CROSS-REFERENCE TO RELATED APPLICATIONS" to read as follows:

This application is related to copending applications entitled "Cyclone Separating Apparatus and Vacuum Cleaner having the same" (U.S. Application Serial No. 10/840,230, filed May 7, 2004), "Cyclone Dust Separating Apparatus and Vacuum Cleaner having the same" (U.S. Application Serial No. 10/840,231, filed May 7, 2004), and "Cyclone Separating Apparatus and Vacuum Cleaner having the same" (U.S. Application Serial No.10/840,248, filed May 7, 2004), whose disclosures are commonly owned by the same assignee as the present application and are entirely incorporated herein by reference.

Signed and Sealed this

Seventeenth Day of April, 2007

JON W. DUDAS

*Director of the United States Patent and Trademark Office*